3,165,887
METHOD OF OPERATING A PROPULSION ENGINE WITH POLYSUBSTITUTED METHANE FUEL
Stanley D. Koch, Swampscott, Mass., assignor to Monsanto Research Corporation, St. Louis, Mo., a corporation of Delaware
No Drawing. Filed July 2, 1962, Ser. No. 207,026
5 Claims. (Cl. 60—35.4)

This invention relates to high energy fuels. More particularly, this invention relates to methods of developing thrust and to methods of operating reaction type power plants. This invention especially contemplates the upgrading of high energy fuel compositions by the addition thereto of a polysubstituted methane.

The development of reaction type power plants has been accompanied by the requirement for developing fuels suitable for use in such engines. In a reaction type power plant, fuel and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas-turbine or a turbo-prop engine, the exhaustion of the high temperature gases is directed into a turbine which drives a propeller or other mechanical means for developing a forward thrust. Reaction power plants may be used in widely different types of vehicles such as in space ships, aircraft, boats, guided missiles, automobiles and the like.

Heretofore it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations.

Another serious disadvantage of the prior art known fuels is the low heat of combustion of such fuels. Aircraft generally, and particularly military aircraft, are being designed for higher and higher speeds requiring higher energy level fuels. The fuel must not only have a high energy level on a weight basis or high B.t.u./lb., but also a high energy level on a volume basis or a high B.t.u./gal., since wing sections are being made thinner in order to reduce drag and the space for storage of fuel is limited. Thus, aircraft are very often volume-limited as well as weight-limited for the storage of fuel. Aircraft are particularly volume-limited using the currently available JP-6 high energy fuel which has a heat of combustion of 18,400 B.t.u./lb. on a weight basis, but a heat of combustion of only 119,500 B.t.u./gal. on a volume basis. Therefore, it is particularly desirable to provide a high energy fuel having a high heat of combustion on a volume basis, preferably greater than 120,000 B.t.u./gal., and at the same time obtain the other characteristics necessary for a good fuel of this type.

Another disadvantage of the presently known fuels is that they have high vapor pressures and tend to flash-off rapidly in power plants operated at high elevations and high temperatures, thereby resulting in an appreciable loss of fuel. Although this difficulty can be overcome by pressurizing the fuel tanks, the structural strength of the fuel tanks must also be increased, adding to the weight and volume of the vehicle. Thus, present day aircraft using the current JP-6 fuel are both altitude limited and weight limited because such fuel has a boiling point in the range of from 300° F. to 350° F. It is desirable that a fuel have a boiling point at least above 400° F. in order to overcome these limitations.

An object of this invention is to provide high energy fuel compositions for use in reaction type power plants.

Another object of this invention is to provide improved methods of developing thrust.

Another object of this invention is to provide improved methods of operating reaction type power plants, particularly jet propulsion type engines, including rocket, ram-jet, turbo-jet, and pulse-jet engines, and turbine type engines, including turbo-prop and gas-turbine engines.

A further object is to provide new polysubstituted methanes and a process for preparing them.

Still another object is to provide an improved method for operating reaction type power plants in which the fuel composition is improved by the incorporation therein of substantial amounts of a polysubstituted methane.

These and other objects are attained by providing polysubstituted methanes, a process for preparing them and a method for improving thrust in reaction type power plants by incorporating them in substantial amounts into the fuel for the power plant.

The polysubstituted methanes of this invention are cyclopentyldicyclohexylmethanes having the following structural formula

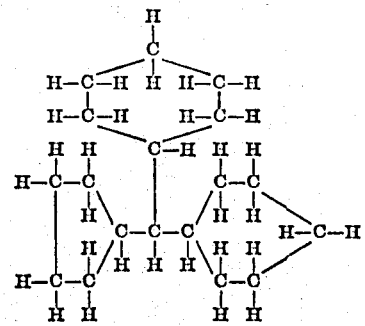

in which one of the hydrogens in the cyclopentyl group may be substituted by a methyl group and from 1 to 2 of the hydrogens of each cyclohexyl group may be substituted by an alkyl group having from 1 to 4 carbon atoms i.e. methyl, ethyl, propyl, isopropyl, butyl, isobutyl, secondary butyl and tertiary butyl groups.

The cyclopentyldicyclohexylmethanes of this invention are conveniently prepared by the hydrogenation of di arylfulvenes of alkylated diarylfulvenes by the well known hydrogenation process using finely divided nickel as a catalyst. The diarylfulvenes in turn are prepared by the reaction of cyclopentadiene or methylcyclopentadiene with a diarylketone as taught by Thiele in Berichte, 33 672 (1900).

The variations in the cyclohexyl groups are attained by using diarylketones having the desired alkylsubstituents on the aryl groups. For example, benzophenone yields diphenylfulvene, phenyltolylketone yields phenyltolylfulvene, etc.

The following examples are given in illustration and not in limitation of the scope of this invention.

EXAMPLE 1

Hydrogenate diphenylfulvene by heating it in a closed vessel under a pressure of 3000 p.s.i.g. of hydrogen in the presence of nickel-on-kieselguhr. Advantageously the vessel should be rocked or provided with a stirring mechanism so that agitation of the contents of the vessel can be maintained throughout the reaction. Since diphenylfulvene is a solid the hydrogenation is preferably carried out in an inert solvent of which hexane is a convenient example. Reduction begins at about 80° C. The temperature of the hydrogenation reaction should be maintained at that temperature throughout and the reaction should be continued until hydrogen is no longer absorbed by the system.

The product is a hexane solution of cyclopentyldicyclohexylmethane containing catalyst particles suspended therein. Purification is attained by filtration or centrifugation followed by distillation under reduced pressure. The cyclopentyldicyclohexylmethane is solid at room temperature but melts at slightly elevated temperatures.

If diphenylmethylfulvene (prepared from benzophenone and methyl cyclopentadiene) is used in the above example, the product is methylcyclopentyldicyclohexylmethane.

*Table 1.—Thermal and physical properties of cyclopentyldicyclohexylmethane*

| | |
|---|---|
| Hydrogen/carbon ratio | 0.148. |
| Index of refraction, $n_D^{20}$ | 1.504 (supercooled). |
| Boiling point | 137.5–138° C./1.1 mm. |
| Density, $d_4^{20}$ | 0.925. |
| Heat of combustion, B.t.u./lb., net | 18,360. |
| Heat of combustion, B.t.u./gal., net | 141,700. |
| Viscosity, cs.: | |
| At 38° C. | 40.0. |
| At 99° C. | 4.11. |
| At 149° C. | 1.70. |
| Thermal decomposition temp., ° F. | 649. |
| Melting point | 42.5–43° C. |

Heats of combustion were obtained with a Parr oxygen bomb calorimeter on both a weight and a volume basis following the ASTM D–240–57T procedure. Viscosities at various temperatures were measured using the standard Cannon-Fenske capillary viscosity-meter following ASTM D–445 procedure.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature was measured at which the fuel began to decompose and evolve gas as determined by the changes in pressure within the bomb. In this method, the formation of deposits in the decomposition reaction is not measured because some fuels may start to decompose to gas before forming deposits.

The above example indicates that the polysubstituted methanes of this invention are very suitable for use as additives to conventional fuels in various reaction type power plants. The polysubstituted methanes have particularly high heats of combustion on a volume basis and may therefore be very advantageously added to conventional fuels employed in both jet propulsion type engines and gas-turbine engines where there is a space limitation for the storage of fuel. Thus, the 141,700 B.t.u./gal. heat of combustion of cyclopentyldicyclohexylmethane can be used to raise the volumetric heat of combustion of conventional fuels to permit a jet propulsion aircraft to fly considerably further than an aircraft having the same size storage tanks and using unmodified the currently available JP–6 fuel which has a heat of combustion of only 119,500 B.t.u./gal. Another advantage is utilizing the polysubstituted methane fuels of this invention in reaction type power plants is that these fuels are relatively high boiling points, thus possessing a very broad boiling range. If the fuel has a very low boiling point, large amounts of the fuel will be lost at higher altitudes by vaporization unless the system is fully pressurized. Thus, the relatively high boiling point of cyclopentyldicyclohexylmethane increases the efficiency of conventional fuels and permits an aircraft to operate at considerably higher temperatures than an aircraft using the unmodified JP–6 fuel having a lower boiling point.

The polysubstituted methanes of this invention are also characterized by good thermal stabilities when employed as adjuvants to conventional fuels in a reaction type power plant. This factor is of importance not only in the actual combustion taking place in the engine, but also in the fuel system prior to the burning step. For example, it is necessary in high speed aircraft to use the fuel reservoir to absorb the aerodynamic heat which builds up faster than can be dissipated to the atmosphere and thereby heats the fuel to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the polysubstituted methanes as adjuvants to conventional fuels of this invention, the modified fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet and gas-turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or other chemical oxidizer, for example, fuming nitric acid, hydrogen peroxide, fluorine, and the like, in guided missile and rocket applications. In some applications, a mixture of oxidizing agents will also be useful.

The polysubstituted methane compositions of the present invention are soluble in and should be blended with conventional fuels such as gasoline, kerosene, mixtures of gasoline and kerosene, other aviation fuels, and with the present hydrocarbon jet fuels to produce an improved fuel over the presently available fuels. More particularly, the fuels described herein may be added to the present aliphatic hydrocarbon jet fuels having a heat of combustion of about 112,000 B.t.u./gal. to raise the overall heat of combustion thereof to at least about 120,000 B.t.u./gal.

The amount of polysubstituted methane may vary between 10 and 50 volume percent of the fuel composition. Substantial improvement of the overall heat of combustion is attained if as little as 10 volume percent is used rising to a maximum at 50 volume percent. Beyond this amount the relatively high melting point of the polysubstituted methanes begins to present a serious problem at low temperatures. The fuels described herein may be used in combination with fuel additives to improve various characteristics of the fuel, including liquid viscosity, burning characteristics, and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.0005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing polysubstituted methane as an essential ingredient, (2) improved methods of developing thrust, and (3) methods of operating reaction type power plants.

What is claimed is:

1. A high energy fuel composition for use in a reaction type power plant containing from 10 to 50 volume percent of a cyclopentyldicyclohexylmethane in which the cyclopentyl ring substituents are selected from the class consisting of hydrogen and methyl groups, the substituents of each cyclohexyl ring are selected from the class consisting of hydrogen and alkyl groups containing from 1 to 4 carbon atoms, the maximum number of said methyl groups on said cyclopentyl ring is one, and the maximum number of said alkyl groups on each said cyclohexyl ring is one to two.

2. The method of operating a reaction type power plant, said method comprising injecting a stream of an oxidizing agent and a stream of a fuel containing 10 to 50 volume percent of a polysubstituted methane as defined in claim 1 into the composition chamber of said reaction type power plant, oxidizing said fuel in said combustion chamber so as to impart thrust.

3. The method of operating a jet-propulsion eng said method comprising injecting a stream of an oxidi agent and a stream of a fuel containing 10 to 50 vol percent of a polysubstituted methane as defined in cl 1 into the combustion chamber of said jet-propulsion gine, oxidizing said fuel in said combustion chamber, exhausting the resulting gases in a rearward direction f said combustion chamber so as to impart thrust to jet-propulsion engine.

4. The method of operating a gas-turbine engine, method comprising injecting a stream of an oxidi agent and a stream of a fuel containing 10 to 50 volt percent of a polysubstituted methane as defined in cl 1 into the combustion chamber of said gas-turbine gine, oxidizing said fuel in said combustion chaml and exhausting the resulting gases from said combust chamber through a turbine to develop motive powei 5. The method of operating a turbo-jet engine, method comprising injecting a stream of air and a stre of a fuel containing 10 to 50 volume percent of a p substituted methane as defined in claim 1 into the c bustion chamber of said turbo-jet engine, burning fuel in said combustion chamber, exhausting the resul gases from said combustion chamber through a turb to expand the same and compress the air supplied to combustion chamber, and passing the gases into the atn phere by way of a nozzle to impart thrust to said eng References Cited in the file of this patent
UNITED STATES PATENTS

| | | |
|---|---|---|
| 2,769,849 | Schmerling | Nov. 6, 1! |
| 2,771,739 | Malina et al. | Nov. 27, 1! |
| 2,826,037 | Scott et al. | Mar. 11, 1! |
| 2,954,411 | Hawthorne | Sept. 27, 1! |